US010540541B2

(12) United States Patent
Dugan et al.

(10) Patent No.: US 10,540,541 B2
(45) Date of Patent: *Jan. 21, 2020

(54) COGNITIVE IMAGE DETECTION AND RECOGNITION

(71) Applicant: International Business Machines Corporation, Armonk, NY (US)

(72) Inventors: Casey Dugan, Cambridge, MA (US); Werner Geyer, Newton, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/722,266

(22) Filed: May 27, 2015

(65) Prior Publication Data
US 2015/0347825 A1 Dec. 3, 2015

Related U.S. Application Data

(60) Provisional application No. 62/003,197, filed on May 27, 2014.

(51) Int. Cl.
G06K 9/00 (2006.01)
G06K 9/62 (2006.01)

(52) U.S. Cl.
CPC .................. *G06K 9/00288* (2013.01)

(58) Field of Classification Search
None
See application file for complete search history.

(56) References Cited

U.S. PATENT DOCUMENTS

| 8,761,446 | B1 | 6/2014 | Frome et al. |
| 8,861,804 | B1 | 10/2014 | Johnson et al. |
| 8,873,813 | B2 | 10/2014 | Tadayon et al. |
| 9,208,548 | B1 * | 12/2015 | Noble ................ G06T 5/50 |
| 2006/0239515 | A1 * | 10/2006 | Zhang ............ G06F 17/30265 382/118 |
| 2009/0141945 | A1 * | 6/2009 | Milne ................ G06K 9/6293 382/116 |

(Continued)

OTHER PUBLICATIONS

Chen et al. ( 2011). Learning facial attributes by crowdsourcing in social media. In Proceedings of the 20th international conference companion on World wide web (WWW '11). ACM, New York, NY, USA,pp. 25-26. : Doi=10.1145/1963192.

(Continued)

*Primary Examiner* — David Perlman
(74) *Attorney, Agent, or Firm* — Cantor Colburn LLP; Anthony Curro (57) ABSTRACT

Embodiments are directed to an image processing station for associating a non-trusted data set with a trusted data set. The station includes a memory and a user interface configured to receive the trusted data set and the non-trusted data set. The station further includes a processor system communicatively coupled to the memory and the user interface. The processor system is configured to generate, based at least in part on processing the trusted data set and the non-trusted data set, a confidence value that represents a probability that at least a portion of the non-trusted data set identifies at least a portion of the trusted data set.

18 Claims, 6 Drawing Sheets

(56) References Cited

U.S. PATENT DOCUMENTS

| | | | |
|---|---|---|---|
| 2010/0287053 A1* | 11/2010 | Ganong | G06F 17/30247 |
| | | | 705/14.66 |
| 2011/0188713 A1* | 8/2011 | Chin | G06F 17/30247 |
| | | | 382/118 |
| 2012/0027256 A1* | 2/2012 | Kiyohara | G06F 17/30029 |
| | | | 382/103 |
| 2012/0114199 A1 | 5/2012 | Panyam et al. | |
| 2012/0141017 A1* | 6/2012 | Krupka | G06K 9/00228 |
| | | | 382/159 |
| 2012/0227256 A1* | 9/2012 | Clew | B21J 15/323 |
| | | | 29/816 |
| 2013/0262588 A1 | 10/2013 | Barak et al. | |
| 2014/0016013 A1 | 1/2014 | Huang et al. | |

OTHER PUBLICATIONS

Yardi et al. Photo-based authentication using social networks. In Proceedings of the first workshop on Online social networks (WOSN '08). ACM, New York, NY, USA, 55-60. DOI=10.1145/1397735.1397748 : See p. 57. 2008. (5 pages).

Casey Dugan, "Cognitive Image Detection and Recognition" U.S. Appl. No. 14/744,058, filed Jun. 19, 2015.

List of IBM Patents or Patent Applications Treated As Related—Date Filed: Jul. 28, 2015; 2 page.

Viola, et al. "Robust Real-time Object Detection," International Journal of Computer Vision, 2001, 25 pages.

\* cited by examiner

COGNITIVE IMAGE DETECTION AND RECOGNITION

DOMESTIC PRIORITY

The present application claims priority to U.S. provisional patent application Ser. No. 62/003,197, titled "COGNITIVE FACE DETECTION/RECOGNITION 'IN THE WILD'," filed May 27, 2014, assigned to the assignee hereof and expressly incorporated by reference herein.

BACKGROUND

The present disclosure relates in general to electronic image detection and/or recognition. More specifically, the present disclosure relates to systems and methodologies for performing robust electronic face recognition using minimal user input.

The internet, and particularly social media/networking sites such as Facebook, Twitter, Flickr, Google Plus, and the like, have made it convenient for users to share photos of themselves and others online. These sites include features that allow a person who uploads a photo to label or "tag" people depicted in the photo. For example, Facebook includes functionality that allows users to locate a person who is present in a photo by clicking on the person's image in the photo and then typing a name of the person. Facebook further offers functionality to auto-complete the name based on other existing Facebook users. The user can repeat this process to locate and label each person within the photo. In this way, the user provides the standard input required for both face detection algorithms and face recognition algorithms. In general, face detection algorithms require an input of the number and location of faces present within an image, and face recognition algorithms require an input of the person label associated with each face object.

User experience (UX) involves a person's behaviors, attitudes, and emotions about using a particular product, system or service. UX includes the practical, experiential, meaningful and valuable aspects of human-computer interaction and product ownership. Additionally, UX includes a person's perceptions of system aspects such as utility, ease of use and efficiency. UX is impacted by the amount of information that a user is required to enter into a system in order to have that system perform a particular task.

SUMMARY

Embodiments are directed to an image processing station for associating a non-trusted data set with a trusted data set. The station includes a memory and a user interface configured to receive the trusted data set and the non-trusted data set. The station further includes a processor system communicatively coupled to the memory and the user interface. The processor system is configured to generate, based at least in part on processing the trusted data set and the non-trusted data set, a confidence value that represents a probability that at least a portion of the non-trusted data set identifies at least a portion of the trusted data set.

Embodiments are further directed to a computer implemented method of associating a non-trusted data set with a trusted data set. The method includes receiving, at a user interface of an image processing station, the trusted data set and the non-trusted data set. The method further includes generating, using a processor system of the image processing station communicatively coupled to a memory and the user interface, based at least in part on processing the trusted data set and the non-trusted data set, a confidence value that represents a probability that at least a portion of the non-trusted data set identifies at least a portion of the trusted data set.

Embodiments are further directed to a computer program product for associating a non-trusted data set with a trusted data set. The computer program product includes a computer readable storage medium having program instructions embodied therewith, wherein the computer readable storage medium is not a transitory signal per se. The program instructions are readable by at least one processor circuit of an image processing station to cause the at least one processor circuit to perform a method. The method includes receiving, at a user interface of the image processing station, the trusted data set and the non-trusted data set. The method further includes generating, using the at least one processor circuit communicatively coupled to a memory and the user interface, based at least in part on processing the trusted data set and the non-trusted data set, a confidence value that represents a probability that at least a portion of the non-trusted data set identifies at least a portion of the trusted data set.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present disclosure is particularly pointed out and distinctly claimed in the claims at the conclusion of the specification. The foregoing and other features and advantages are apparent from the following detailed description taken in conjunction with the accompanying drawings in which:

In the accompanying figures and following detailed description of the disclosed embodiments, the various elements illustrated in the figures are provided with three or four digit reference numbers. The leftmost digit(s) of each reference number corresponds to the figure in which its element is first illustrated.

DETAILED DESCRIPTION

Various embodiments of the present disclosure will now be described with reference to the related drawings. Alternate embodiments may be devised without departing from the scope of this disclosure. It is noted that various connections are set forth between elements in the following description and in the drawings. These connections, unless specified otherwise, may be direct or indirect, and the present disclosure is not intended to be limiting in this respect. Accordingly, a coupling of entities may refer to either a direct or an indirect connection.

Additionally, it is understood in advance that although this disclosure includes a detailed description of processing trusted image information/data and non-trusted name information/data, implementation of the teachings recited herein are not limited to situations in which the trusted information/data is an electronic image and the non-trusted information/data is a name. Rather, embodiments of the present disclosure are capable of being implemented in conjunction with any other type of trusted and non-trusted information/data processing and/or computing environment now known or later developed.

As previously noted herein, the internet, and particularly social media/networking sites such as Facebook, Twitter, Flickr, Google Plus, and the like, have made it convenient for users to share photos of themselves and others online. These sites include features that allow a person who uploads a photo to label or "tag" people depicted in the photo. For example, Facebook includes functionality that allows users to locate a person who is present in a photo by clicking on the person's image in the photo and then typing a name of the person. Facebook further offers functionality to auto-complete the name based on other existing Facebook users. The user can repeat this process to locate and label each person within the photo. In this way, the user provides the standard input required for both face detection algorithms and face recognition algorithms. In general, face detection algorithms require an input of the number and location of faces present within an image, and face recognition algorithms require an input of the person label associated with each face object.

UX involves a person's behaviors, attitudes, and emotions about using a particular product, system or service. UX includes the practical, experiential, meaningful and valuable aspects of human-computer interaction and product ownership. Additionally, UX includes a person's perceptions of system aspects such as utility, ease of use and efficiency. The amount of information that a user is required to enter into a system in order to have that system perform a particular task impacts UX. More particularly, reducing the amount of information a user is required to enter into a system in order to have that system perform a particular task can improve the user's UX.

Accordingly, the present disclosure relates to image detection and recognition methodologies. More specifically, the present disclosure relates to systems and methodologies for performing robust face image recognition using minimal user input. The systems and methodologies of the present disclosure collect identity information from trusted and non-trusted sources and employ comparison and reasoning techniques to corroborate identifying information from trusted and non-trusted sources. The systems and methodologies of the present disclosure include feedback systems that allow the systems and methodologies of the present disclosure to learn and improve over time.

Figure 1:
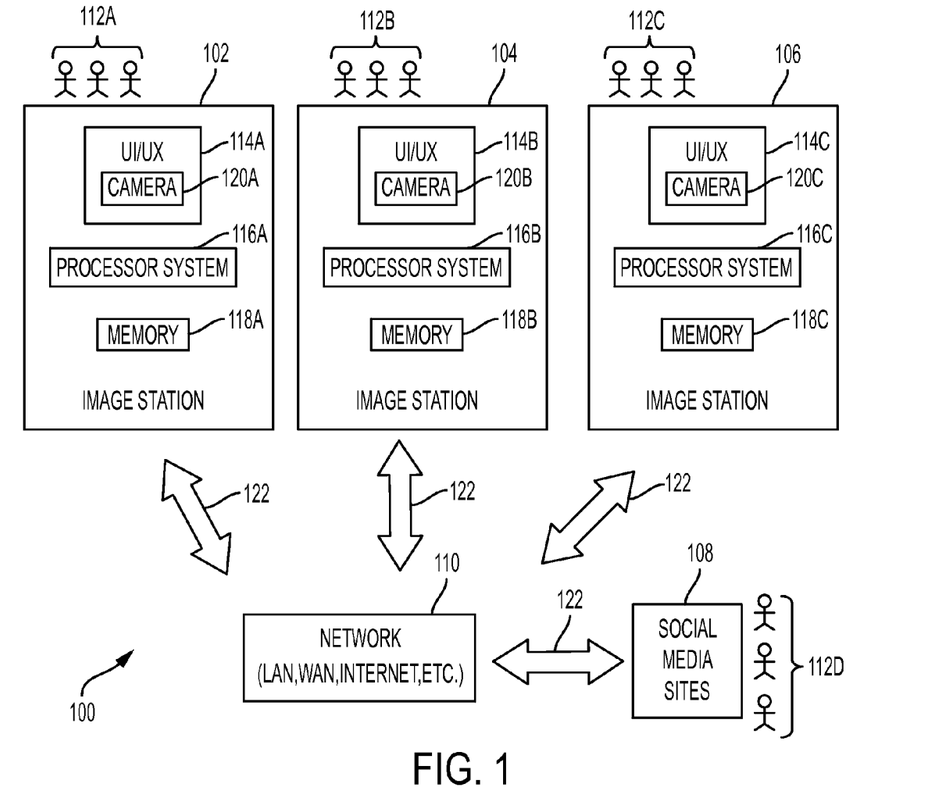
FIG. 1 depicts a diagram illustrating a system according to one or more embodiments.

Turning now to the drawings in greater detail, wherein like reference numerals indicate like elements, FIG. 1 depicts a diagram illustrating an image processing system 100 according to one or more embodiments. Image processing system 100 processes non-trusted input information and trusted input information for purposes of determining the non-trusted input information that identifies the trusted input information. For example, system 100 may receive and process a listing of one or more names (i.e., non-trusted input information) and an image (i.e., trusted input information) for purposes of determining each name from among the one or more names that corresponds to and identifies a particular person in the image. In accordance with one or more embodiments of the present disclosure, the amount of input required from a user of system 100, as well as the effort required from the user in order to provide the input, is minimized because users need only allow system 100 to capture an image of the users and then input to system 100 the names of the people in the image. The user does not need to also associate a name with a person in the image. System 100, using various face detection, face recognition, data comparison and rule-based reasoning operations, accurately locates faces on the image and determines whether each name input to system 100 can be accurately associated with a person depicted in an image input to system 100. Limiting the amount of information a user needs to input to system 100 in this manner positively impacts UX.

As shown in FIG. 1, system 100 includes a plurality of image stations 102, 104, 106 and social media sites 108 in communication with each other over communication paths 122 through a network 110. For ease of illustration, three image stations are shown in FIG. 1. However, system 100 may include any number of image stations. Each image station 102, 104, 106 includes a user interface/user experience (UI/UX) component 114A, 114B, 114C, a processor system 116A, 116B, 116C and a memory 118A, 118B, 118C, configured and arranged as shown. One or more users 112A, 112B, 112C, 112D interface with image stations 102, 104, 106 and social media sites 108. Social media sites 108 include but are not limited to Facebook, Twitter, Flickr, Google Plus, and the like.

Each UI/UX 114A, 114B, 114C receives images and other inputs from and provides communications to users 112A, 112B, 112C. For example, each UI/UX 114A, 114B, 114C includes a camera 120A, 120B, 120C to receive image inputs from users 112A, 112B, 112C. Each UI/UX 114A, 114B, 114C may include a variety of configurations for receiving inputs and providing communications, including but not limited to a monitor, a keyboard, a point and click device, a touch screen, a microphone, a wireless receiver (e.g., a bluetooth receiver), a motion sensor, an optical sensor, a memory card/stick port, and the like. A user may provide inputs to an image station in a variety of ways. For example, a user may provide inputs to an image station directly, for example as an image of the user(s) captured by camera 120A, 120B, 120C. A user may also provide inputs to an image station indirectly, for example through an intermediary device such as the user's smartphone that is configured to transfer images and data stored in the phone to an image station through that image station's UI/UX. Each UI/UX 114A, 114B, 114C may be specifically designed to improve a person's behaviors, attitudes, and emotions about using image stations 102, 104, 106. More specifically, each UI/UX 114A, 114B, 114C may be designed to enhance the utility, ease of use and efficiency of system 100, with a particular emphasis on a UI/UX that supports and enhances the positive UX impact of the reduced amount of information users 112A, 112B, 12C are required to enter into system 100 in order to have system 100 perform tasks in accordance with one or more embodiments of the present disclosure.

Image stations 102, 104, 106 and social media sites 108 communicate with each other through network 110, which may be implemented as one or more wide area networks (WANs) and/or local area networks (LANs) such as the internet, intranet(s), and/or wireless communication network(s). Image stations 102, 104, 106 and social media sites 108 are in communication via communication paths 122, e.g., to communicate data between them. Each processor system 116A, 116B, 116C may be implemented as a single processor circuit or multiple processor circuits working together. Although processor system 116A, 116B, 116C and memory 118A, 118B, 118C are shown as separate components, it is intended that the processor system's functionality and the memory functionality may also be provided as one or more integrated components.

A high level description of the operation of system 100 will now be described with reference to image station 102 of FIG. 1. More detailed descriptions of the operation of system 100 are provided later in this disclosure and illustrated in FIGS. 2-5. In operation, one or more users 112A, 112B, 112C input trusted information/data and non-trusted information/data via UI/UX 114A. An example of trusted information includes an image of users 112A, 112B, 112C captured by camera 120A. In general, trusted information is information from a reliable source, such as electronic image data capture by camera 120A. An example of non-trusted information includes the names of the persons in the image of users 112A, 112B, 112C captured by camera 120A. In general, non-trusted information is information from an unreliable source, such as inputs from humans (e.g., users 112A, 112B, 112C) entered at UI/UX 114A that for various reasons may or may not be accurate. In accordance with one or more embodiments of the present disclosure, users are not required to associate non-trusted input information (e.g., a name) with trusted input information (e.g., a person in the image). System 100, using various face detection, face recognition, data comparison and rule-based reasoning operations, accurately locates faces on the image and determines whether each name input to system 100 can be accurately associated with a person depicted in an image input to system 100. Limiting the amount of information a user needs to input to system 100 in this manner positively impacts UX.

Processor system 116A processes trusted and non-trusted input information. For image-type trusted input information, processor system 116A processes the image using face detection and face recognition processes to in effect locate the faces in the image. For name-type non-trusted input information, processor system 116A applies data comparison and rule-based reasoning operations to the names and the face data to determine whether each name input to system 100 can be accurately associated with a person depicted in the image input to system 100. A person depicted in an image that can be accurately associated with a name input to system 100 are marked as "identified" persons and stored in memory 118A. Persons depicted in an image that cannot be accurately associated with a name input to system 100 are marked "partially-identified" persons and stored in memory 118A. The data comparison and rule-based reasoning operations of processor system 116A learn and improve over time by taking into account additional information including previously determined "identified" persons stored in memory 118A, previously determined "partially-identified" persons stored in memory 118A, and "identified" persons and "partially-identified" persons stored in other image stations (e.g., 104, 106) and accessed by image station 102 via network 110 and communication paths 122. In one or more embodiments, the data comparison and rule-based reasoning operations of processor system 116A may be further enhanced by taking into account additional information (e.g., information relevant to input images and/or names) accessed by image station 102 from social media sites 108 via network 110 and communications paths 122.

Figure 2:
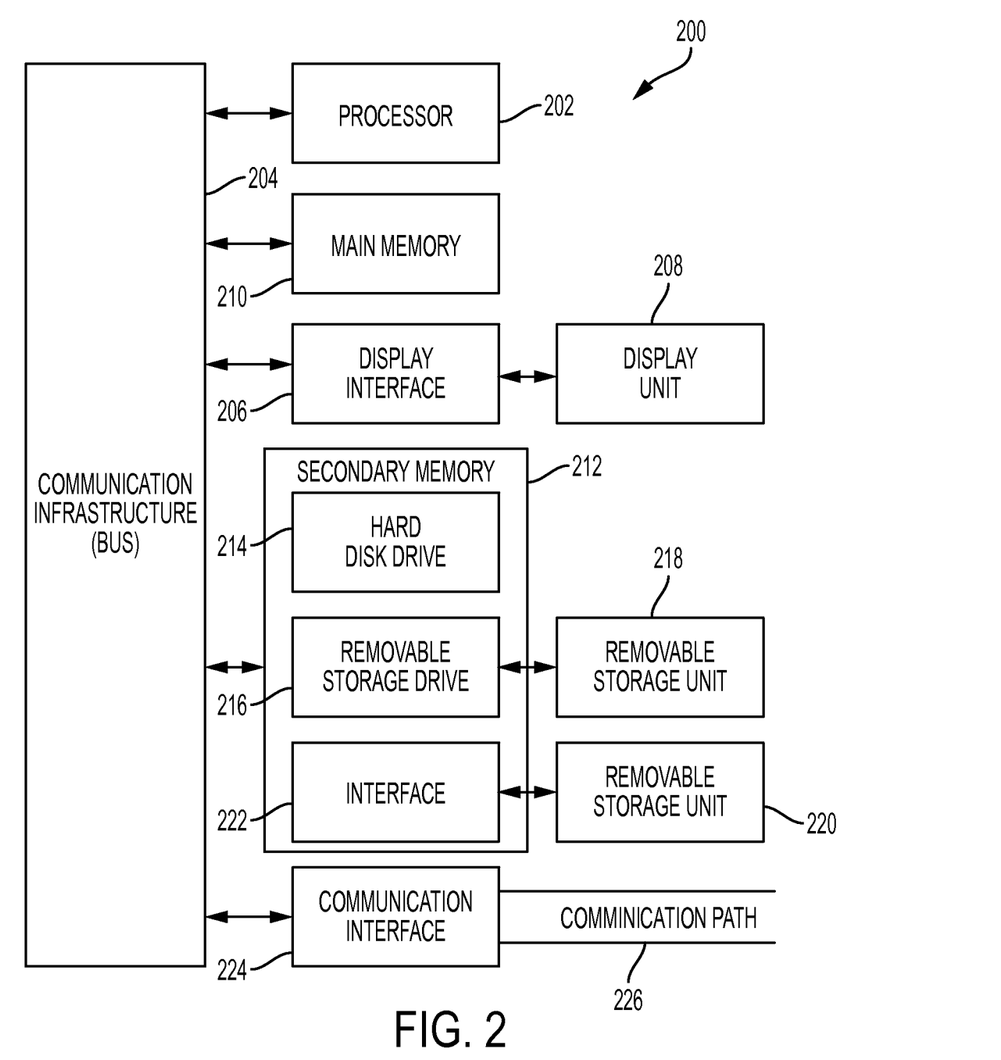
FIG. 2 depicts an exemplary computer system capable of implementing one or more embodiments of the image stations shown in FIG. 1.

FIG. 2 illustrates a high level block diagram showing an example of a computer-based image processing system 200 useful for implementing one or more embodiments of image stations 102, 104, 106 shown in FIG. 1. Although one exemplary computer system 200 is shown, computer system 200 includes a communication path 226 (corresponding to communication paths 122 shown in FIG. 1), which connects computer system 200 to additional systems (e.g., image stations 102, 104, 106 and social media sites 108 shown in FIG. 1) and may include one or more wide area networks (WANs) and/or local area networks (LANs) such as the Internet, intranet(s), and/or wireless communication network(s). Computer system 200 and additional system are in communication via communication path 226, e.g., to communicate data between them.

Computer system 200 includes one or more processors, such as processor 202. Processor 202 is connected to a communication infrastructure 204 (e.g., a communications bus, cross-over bar, or network). Computer system 200 can include a display interface 206 that forwards graphics, text, and other data from communication infrastructure 204 (or from a frame buffer not shown) for display on a display unit 208. Computer system 200 also includes a main memory 210, preferably random access memory (RAM), and may also include a secondary memory 212. Secondary memory 212 may include, for example, a hard disk drive 214 and/or a removable storage drive 216, representing, for example, a floppy disk drive, a magnetic tape drive, or an optical disk drive. Removable storage drive 216 reads from and/or writes to a removable storage unit 218 in a manner well known to those having ordinary skill in the art. Removable storage unit 218 represents, for example, a floppy disk, a compact disc, a magnetic tape, or an optical disk, etc. which is read by and written to by removable storage drive 216. As will be appreciated, removable storage unit 218 includes a computer readable medium having stored therein computer software and/or data.

In alternative embodiments, secondary memory 212 may include other similar means for allowing computer programs or other instructions to be loaded into the computer system. Such means may include, for example, a removable storage unit 220 and an interface 222. Examples of such means may include a program package and package interface (such as that found in video game devices), a removable memory chip (such as an EPROM, or PROM) and associated socket, and other removable storage units 220 and interfaces 222 which allow software and data to be transferred from the removable storage unit 220 to computer system 200.

Computer system 200 may also include a communications interface 224. Communications interface 224 allows software and data to be transferred between the computer system and external devices. Examples of communications interface 224 may include a modem, a network interface (such as an Ethernet card), a communications port, or a PCM-CIA slot and card, etcetera. Software and data transferred via communications interface 224 are in the form of signals which may be, for example, electronic, electromagnetic, optical, or other signals capable of being received by communications interface 224. These signals are provided to communications interface 224 via communication path (i.e., channel) 226. Communication path 226 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 210 and secondary memory 212, removable storage drive 216, and a hard disk installed in hard disk drive 214. Computer programs (also called computer control logic) are stored in main memory 210 and/or secondary memory 212. Computer programs may also be received via communications interface 224. Such computer programs, when run, enable the computer system to perform the features of the present disclosure as discussed herein. In particular, the computer programs, when run, enable processor 202 to perform the features of the computer system. Accordingly, such computer programs represent controllers of the computer system.

Figure 3:
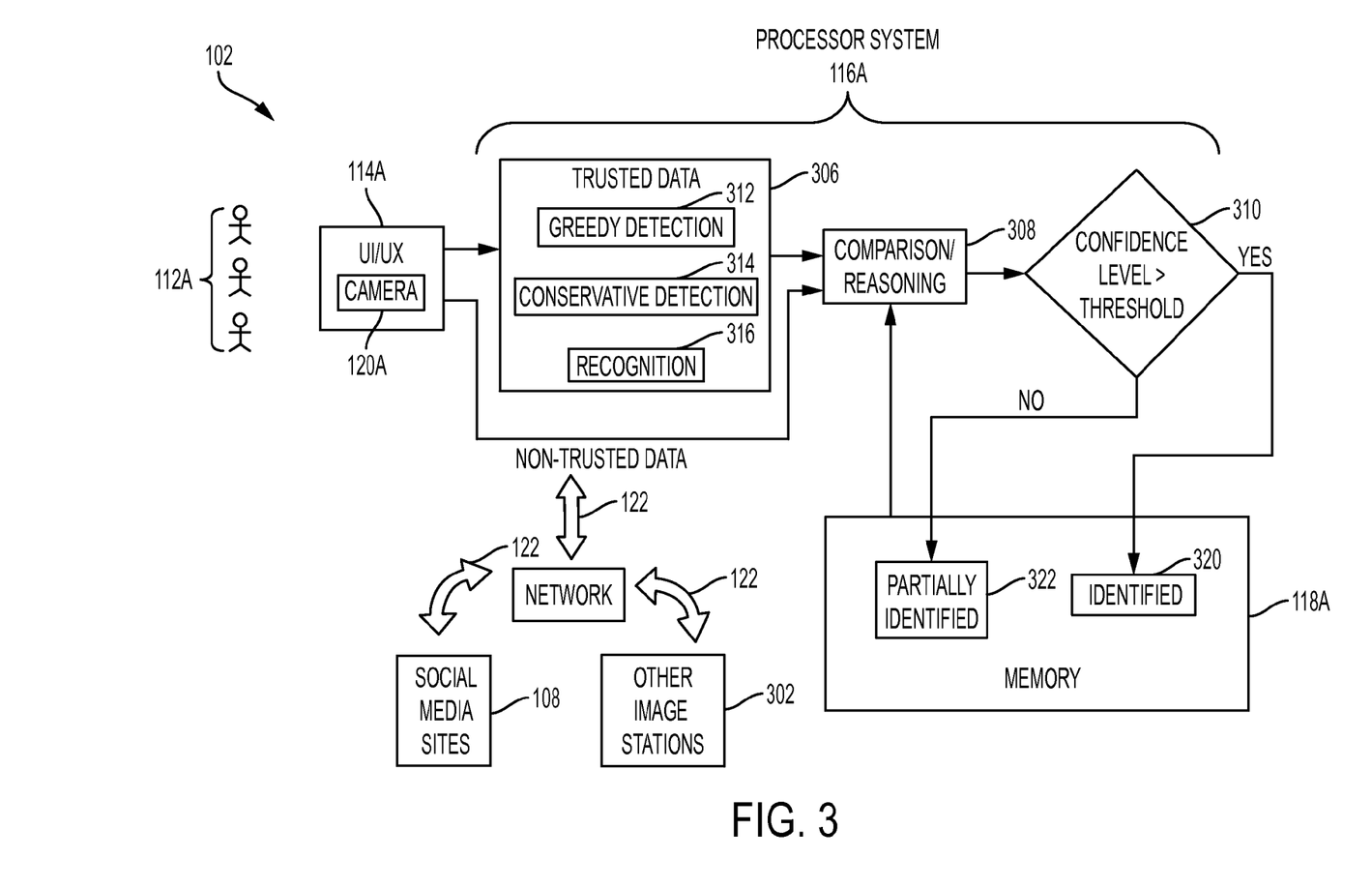
FIG. 3 depicts a diagram illustrating a more detailed implementation of the image stations shown in FIGS. 1 and 2.

FIG. 3 depicts a diagram illustrating a more detailed implementation of image station 102 shown in FIG. 1. Image station 102 shown in FIG. 3 includes image station UI/UX 114A, processor system 116A and memory 118A, configured and arranged as shown. Other image stations 302 (corresponding to image stations 104, 106 shown in FIG. 1) and social media sites 108 (e.g., Facebook, Twitter, Flickr, Google Plus) are in communication with image station 102 via communication paths 122 and network 110. One or more users 112A interface with image station 102 via UI/UX 114A, which receives images and other inputs from and provides communications to users 112A. For example, UI/UX 114A includes a camera 120A to receive image inputs from users 112A. UI/UX 114A may include a variety of configurations for receiving inputs and providing communications, including but not limited to a monitor, a keyboard, a point and click device, a touch screen, a microphone, a wireless receiver (e.g., a bluetooth receiver), a motion sensor, an optical sensor, a memory card/stick port, and the like. A user may provide inputs to an image station in a variety of ways. For example, a user may provide inputs to an image station directly, for example as an image of the user(s) captured by camera 120A. A user may also provide inputs to an image station indirectly, for example through an intermediary device such as the user's smartphone that is configured to transfer images and data stored in the phone to an image station through that image station's UI/UX. UI/UX 114A may be specifically designed to improve a person's behaviors, attitudes, and emotions about using image station 102. More specifically, UI/UX 114A may be designed to enhance the utility, ease of use and efficiency of system 100 (shown in FIG. 1), with a particular emphasis on a UI/UX that supports and enhances the positive UX impact of the reduced amount of information users 112A are required to enter into system 100 in order to have system 100 perform tasks in accordance with one or more embodiments of the present disclosure.

Processor system 116A shown in FIG. 3 includes a trusted data processor component 306, a data comparison and rule-based reasoning (comparison/reasoning) component 308 and a decision module 310, configured and arranged as shown. Trusted data processor component 306 includes a "greedy" face detector component 312 (i.e., a face detector component optimized for face recall but not necessarily precision), a conservative face detector component 314 (i.e., a face detector component optimized for face precision but not necessarily recall) and a face recognition component 316. For image-type trusted input information, trusted data processor component 306 processes the image using face detection and face recognition processes to in effect locate the faces in the image. For name-type non-trusted input information, comparison/reasoning component 308 applies data comparison and rule-based reasoning operations to the names and the face data to generate a confidence value, which represents a probability that a particular name identifies a person. Decision module 310 determines whether the confidence value exceeds a threshold. If the confidence value exceeds the threshold, decision module 310 determines that the particular name accurately identifies a particular person depicted in the image. The particular person so identified is marked "identified" and stored in a portion 320 of memory 118A. If the confidence value does not exceed the threshold, decision module 310 determines that the particular name does not accurately identify a particular person depicted in the image. The persons not identified are marked "partially-identified" and stored a portion 322 of memory 118A.

Comparison/reasoning component 308 learns and improves over time by taking into account addition information including previously determined "identified" persons stored in memory 118A, previously determined "partially-identified" persons stored in memory 118A, and "identified" persons and "partially-identified" persons stored in other image stations 302 and accessed by image station 102 via network 110 and communication paths 122. In one or more embodiments, comparison/reasoning component 308 may be further enhanced by taking into account addition information (e.g., information relevant to input images and/or names) accessed by image station 102 from social media sites 108 via network 110 and communications paths 122.

Figure 4:
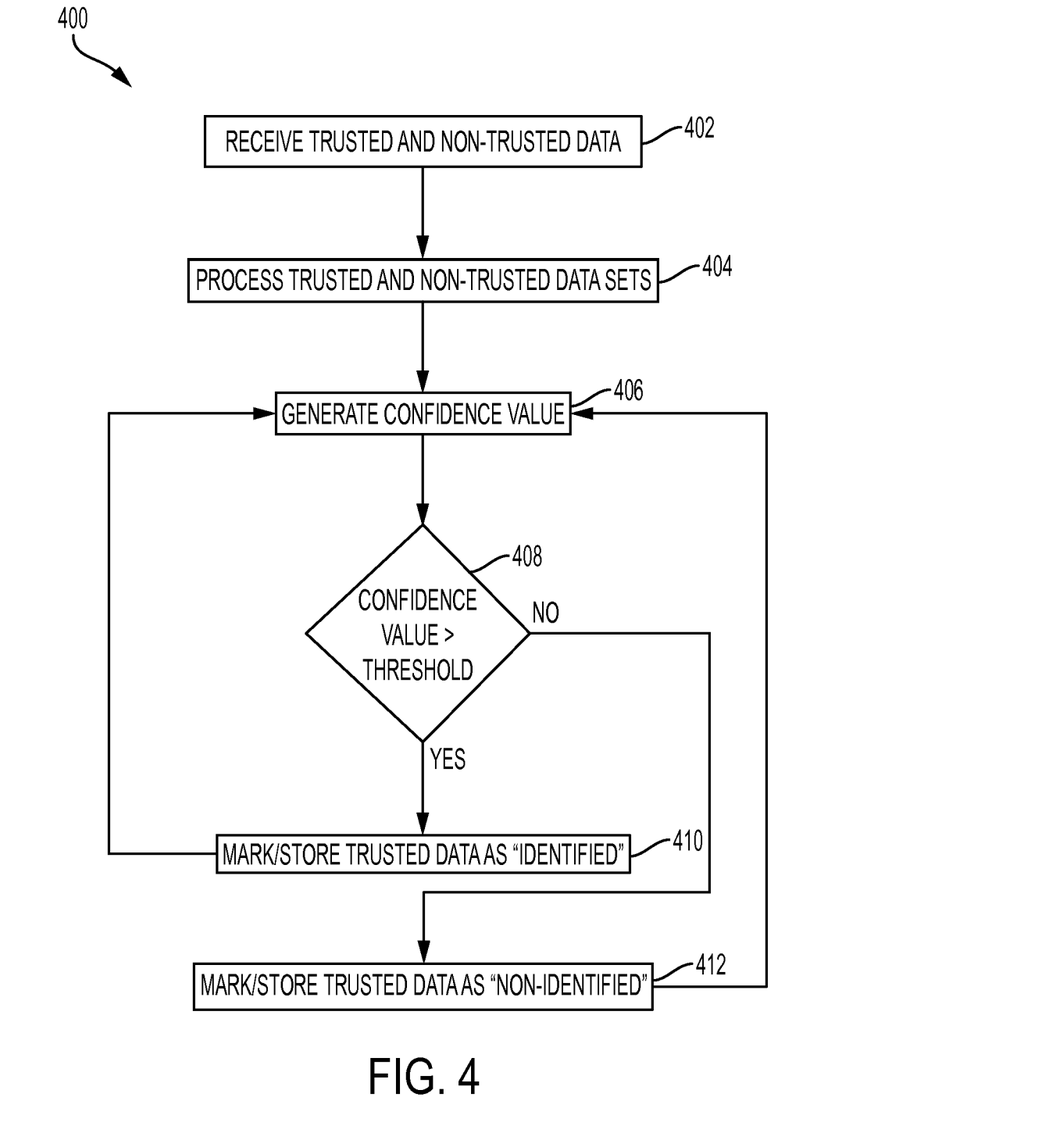
FIG. 4 depicts a flow diagram illustrating an overall methodology according to one or more embodiments.

FIG. 4 depicts a flow diagram illustrating an overall methodology 400 for associating a non-trusted data set with a trusted data set according to one or more embodiments. Methodology 400 begins at block 402 by receiving, at a user interface of an image processing station, a trusted data set and a non-trusted data set. Block 404 processes the trusted data set and the non-trusted data set. In response to the processing of block 404, block 406 generates a confidence value that represents a probability that some portion of the non-trusted data set identifies some portion of the trusted data set. Decision block 408 determines whether the confidence value exceeds a threshold. If the answer to the inquiry at decision block 408 is yes, methodology 400 proceeds to block 410 and stores "identified" trusted data sets, wherein the identified trusted data sets comprise trusted data that has been determined to be identified by non-trusted data. Block 410 feeds back to block 406 to make stored identified trusted data sets available for the generation of subsequent confidence levels. If the answer to the inquiry at decision block 408 is no, methodology 400 proceeds to block 412 and stores "partially-identified" trusted data sets, wherein the partially-identified trusted data sets comprise trusted data that has been determined to not be identified by non-trusted data. Block 412 feeds back to block 406 to make stored partially-identified trusted data sets available for the generation of subsequent confidence levels. In one or more embodiments, block 406 may also take into account when generating confidence values, partially-identified trusted data sets and identified trusted data sets generated by a separate image processing station communicatively coupled to the image processing station through a network. Methodology 400 is continuously iterated such that confidence levels generated by block 406 "learn" and improve over time.

Additional implementation details of UI/UX 114A, greedy face detector component 312, conservative face detector component.314 and face recognition component 316 will now be described with reference to FIG. 3. In order for the human labeler to indicate any number of "persons" previously known to the system, UI/UX 114A may employ a number of user interface elements. For example, autocomplete functionality could be provided to assist a human labeler as he/she tries to enter information about each person being listed in the photo. Autocomplete functionality can proactively list previously-known people that match that information in some way. For example, if the labeler is entering "name" information about a given person, UI/UX 114A can proactively search thru its dataset of names of previously-seen persons. UI/UX 114A should then suggest these potentially-matching, previously-seen persons to the labeler in some way.

In one or more embodiments of UI/UX 114A, where this proactive matching with previously-seen persons is being employed and suggested to the labeler, the system should take care in providing enough very-likely-to-be-true details that an honest labeler is able to identity and choose the correct previously-seen person if he/she exists in the system already (and the system finds and suggests him/her), in order to reduce the chance of mislabeling. The system can choose how much and what type of information about the suggested, previously-seen person is shared with the labeler depending on how likely-to-be-true the system deems each piece/type of information to be. For example, if the labeler is typing a person's name to label them in the photo, and the system starts suggesting those with similar names, the system may also choose to provide the date of the last time this suggested-person was seen/recognized by the system, depending on whether that date seems to be very-likely-to-be-true as determined by the various reasoning mechanisms described herein below.

Alternatively, the system may choose to show an image of the previously-seen suggested person's face next to their name when proactively suggesting him/her, if the system determines that this is very-likely-a-face and very-likely-a-face-belonging-to-that-person using any of the various reasoning mechanisms described herein below. Either of these pieces of information would help an honest labeler disambiguate between multiple known-people with the same name, for example. If the labeler accepts any of these suggestions of previously-seen people, the system will also record the unique person-identifier associated with this previously-seen person when including this person in the "person list."

If a "staged" approach was used in order to gather information from the labeler (first uploading the image with the face, then identifying the "list of persons"), the system can perform image analysis consisting of face detection and face recognition between these steps. If the system does this, for each face detected by the face detection component, it can be run through the face recognition component and a predicted person-label can be determined. The person-label maps to a unique, known person. In one or more embodiments where this proactive matching with previously-seen persons is employed and persons deemed to be similar by the face recognition algorithms are being suggested to the labeler, care should be taken in providing enough very-likely-to-be-true details (as detailed below) that an honest labeler is able to identity and choose the correct previously-known person if he/she exists in the system already (and the system finds and suggests him/her), in order to reduce the chance of mislabeling, just as in the "autocomplete" mechanism described above. Similar to the autocomplete mechanism described above, the system can choose how much and what type of information about the suggested, previously-known person is shared with the labeler depending on how likely-to-be-true the system deems each piece/type of information to be.

In one or more embodiments, the greedy face detector can be used as the mechanism for determining potential faces that are then passed to the face recognition component. It is likely this would result in a larger number of potentially wrong suggested persons, given that the greedy face detector will likely find many (potentially incorrect) faces, and the face recognition component will always suggest the closest matching person label for each of these. In another embodiment of the system, the greedy face detector can be used as the mechanism for determining potential faces and can be used in conjunction with a "confidence threshold" for face recognition. In this embodiment, the system would only suggest to the labeler those persons whose probability of having a matching face was below this threshold (or above, depending on how the confidence is computed). In this embodiment, the number of faces detected is still likely to be high, given that this is the Greedy Face Detector, and each of these are run through the face recognition component, but the human labeler is only recommended those previously-seen people that the system believes are more likely to be present, thereby potentially reducing noise in the recommendations for the human labeler. In still another embodiment, the conservative face detector could be used to detect faces, and those faces passed to the face recognition component to determine the predicted set of previously-seen persons present. This would likely result in fewer but higher-quality recommendations for the human labeler. Still another embodiment could use the conservative face detector in conjunction with a confidence threshold for the face recognition component likely resulting in the lowest number, but potentially highest-quality recommendations, for the human labeler. Just as with the autocomplete scenario described herein above, if the labeler accepts any of these recommendations of previously-seen people that the system deemed likely to be in the image, the system will also record the unique person-identifier associated with this known-person when including this selected person in the "person list."

Typically face detection and recognition components work in conjunction, where a given system seeking to implement face recognition will use face detection in order to first select valid face-subimages from a larger photo, then run face recognition on each of these face-subimages. For any given image, there may be any number of human faces present. Typically, a "face detection" algorithm/classifier is trained using a number of "positive" examples (i.e. cropped photo containing a face object) and a larger number of "negative" examples (i.e. cropped photos of non-face objects, cars, bicycles, walls, etc). The positive and negative example images make up the required input for the face detection process. Using these inputs, a classifier is trained to predict, for a new image, how many "face" objects are present and their locations within the original image. Typically this is done by moving a "window" (rectangle) across the original image, at every possible window position, for every possible window size (above some minimum, such as 20×20 pixels) and checking with the classifier whether there is a face present in that particular "sub-image" (as defined by the intersection of the window and the new photo). Various methods can be used to determine whether that sub-image is believed to be a human face, such as the so-called Viola-Jones object detection framework.

For any given, trained face-detection classifier and any set of test images (with a known number and location of human faces), two metrics can be computed, namely precision and recall. Precision is a metric for determining the probability that when a "face object" is detected by a classifier, it is a "true human face" rather than another type of object, such as a soda can. This is defined as (true positives/(true positives+ false positives)), where false positives are incorrectly classified, non-face objects. Recall is a metric for determining the probability a given classifier will correctly identify all valid human faces in a given image. This is defined as (true positives/(true positives+false negatives)), where false negatives are the number of missed, valid human faces.

Greedy face detector component 312 is optimized for recall, which means that it finds as many potential "faces" as possible out of all those actually present in the photo. Greedy face detector component 312 is not necessarily optimized for precision, which means that it may sometimes incorrectly predict that a non-face object is a face. An appropriate greedy face detector component can be chosen by running a number of previously-trained, out-of-the-box face detectors on a given test dataset (e.g., images with known number and locations of faces) and selecting the one with the best recall value. A custom "greedy" classifier could also be created. In this scenario, as a "true positive input" to the classifier, the classifier could be trained on as many valid human face objects as possible, including those that may not be "perfect" frontal-shots of faces, such as side-shots of faces, shots of faces where part or most of the face may be obscured, blurry photos (i.e. the person may have been moving), photos of faces at varying resolutions/sizes, photos of faces under different lighting conditions, etcetera. Less care would need to be taken in choosing "true negatives" when training the greedy face detector 312 than conservative face detector 314 (described below), as there is reduced consequences for greedy face detector 312 incorrectly identifying another object as a face than in the case of the conservative face detector 314. However, typical "true negative" images (cars, soda cans, etc.) could still be used.

Conservative face detector 314 is optimized for precision, which means that it is best at predicting true human faces. When something is predicted to be a true human face, it is very unlikely to be a non-face object such as a soda can. Conservative face detector 314 is not necessarily optimized for recall, which means that it may sometimes miss a number of true-faces in a given image. An appropriate conservative face detector 314 may be chosen by running a number of previously-trained, out-of-the-box face detectors on a given test dataset (images with known number and locations of faces), and selecting the one with the best precision value. A custom "conservative" classifier could also be created. In this scenario, as a "true positive input" to the classifier, the classifier could be trained on many valid human face objects, however this would be a reduced set of the ones used to train the greedy face detector in the manner described above. In particular, the "best" examples of human faces should be chosen, which means that front-shot faces, side-shot faces, etc. should be included but blurry faces, potentially faces with less ideal lighting conditions (e.g., very dark, very exposed, etc.), partially obscured faces, etc., should not be included. More care would need to be taken in choosing "true negatives" when training the conservative face detector 314 than greedy face detector 312, as there is increased consequences for conservative face detector 314 incorrectly identifying another object than in the case of greedy face detector 312. For example, the system designer may choose to include, as negative examples, objects that are "very nearly" human faces but are not, i.e. cartoon images, drawings, etcetera of human faces, animal faces, etcetera.

Face recognition is the process of comparing a new image containing a human face to a set of known images of faces labeled with person identifiers, and predicting a person label for this new face image. It is noted that multiple images can have the same identifier/label if they are different images of the same person. Different algorithms are available to predict the person label, using different mechanisms of comparing the new image to the set of existing images. Some of these algorithms support "learning", i.e. adding new labels/images to the corpus of known images/labels, while others do not. These algorithms provide the "closest label" from the set of known faces/labels for the new face, however typically they will also provide a confidence value for how confident the algorithm is that this predicted "closest label" is really the correct label for this face.

Face recognition component 316 may be implemented as any face recognition methodology that will allow "online learning," i.e. adding to the corpus of images/names over time. In one or more embodiments, a so-called local binary patterns histogram (LBPH) face recognition component provided out-of-the-box by the OpenCV toolkit. The LBPH face recognition component does not require prior training as it is trained as users upload/label images. In one or more embodiments, the confidence value may be computed such that higher confidence values indicate higher confidence, and lower confidence values indicate lower confidence. The selected face recognition component 316 may then be subjected to testing with test images to determine a reasonable "confidence value" to determine a possible "threshold" below which face recognition component 316 will likely be incorrectly predicting a person/name match for a given face image and above which face recognition component 316 will likely be correctly predicting a person/name match for a given face image. The above scenario is reversed for situations in which the confidence value is computed such that higher confidence values indicate lower confidence, and lower confidence values indicate higher confidence.

Figure 5:
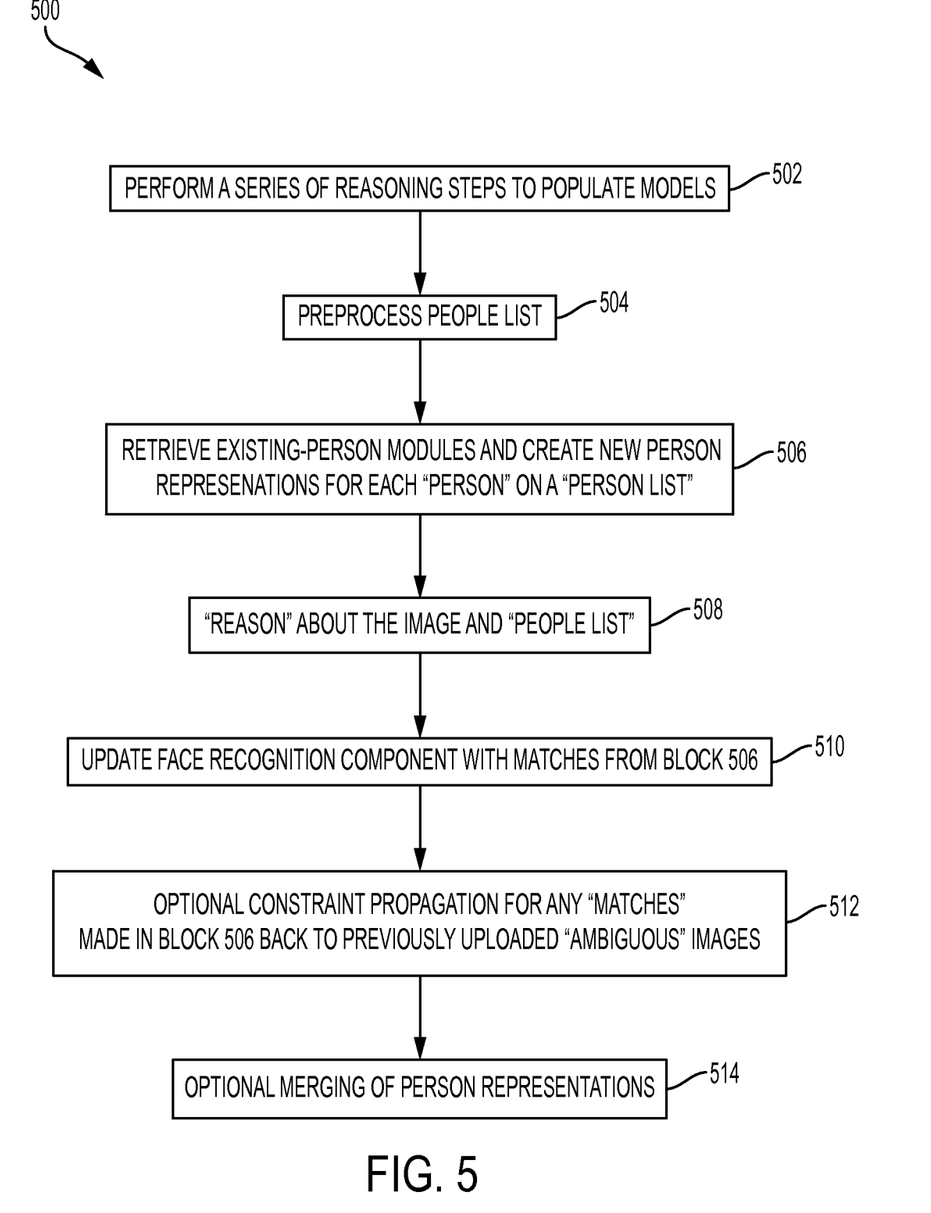
FIG. 5 depicts another flow diagram illustrating a comparison/reasoning methodology according to one or more embodiments.

Additional implementation details comparison/reasoning component 310 will now be described with reference to a methodology 500 shown in FIG. 5. Methodology 500 begins at block 502 by performing a series of reasoning steps to populate models, etcetera using information provided by a human user. The human user provides an image and a set of "persons" present in the image. The image may or may not contain any number of human faces. No particular constraints on resolution, image size, lighting, "clarity" (i.e. non-blurry), etcetera are required of the image. The set of "persons" present in the photo may be provided by the human labeler as a "person list" that may include "persons" previously known about by the system (selected through any of the means described herein) or previously unknown "persons." The person list can also be empty, in the case of honest/dishonest labelers indicating no people are present in the photo. Generally, this information will be treated as "non-trusted" by the system until proven otherwise.

In one or more embodiments of the system, the two inputs above can be entered in a staged approach. In this scenario, the system will first prompt the user to take/upload a photo. In the next stage, the user can then provide the above-described "person list." This staged approach allows the system to perform analysis of the image, such as face detection and face recognition, and potentially proactively recommend known "persons" to the human labeler. In one or more embodiments, these two inputs could be entered at the same time. In still another embodiment, the image input required could be taken from a live video feed which is then "frozen" (i.e. captured at a moment in time) by a human who will then provide the person list for that still image.

When the information provided by the human in is completed/submitted, block 502 then performs a series of reasoning steps. These steps can include generating additional, "trusted" evidence about the incoming photo (for example, by using one/both of its face detection components and its face recognition component). These steps can also include a deductive reasoning/corroboration of evidence step in which it compares evidence from trusted (i.e., information it generates) and potentially non-trusted (i.e., information from the human) sources in order to make intelligent decisions about the identities of those persons present in the photo. Based on those decisions (about the identities of those it determines are potentially present in the photo) the system can then use that information to perform a series of constraint propagations in order to make more informed decisions about the identities of those present in previously uploaded photos. Cases where it could be important to propagate this new information back to previously uploaded photos (constraint propagations) could include where there may have been a discrepancy between what the human labeler and system determined (for example, the face detection components finding ten potential faces and the human labeler specifying only two persons) or where the system was unable to uniquely associate a single identified person to a single face or where a given "face" seemed to be a potentially incorrect face for a given person (whether a mistake or because of dishonest information or simply because it does not seem to match others previously matched with a given person), etcetera.

Based on these reasoning steps, the model of an existing known "person" may be updated or a new "person" representation created by the system. Optionally, in the event of either of these, an additional step could take place where, based on the current model for each person currently in the system, the system may try to automatically "merge" people that it deems may be the "same" using any means (for example, by comparing face image similarity across people, name similarity, etcetera) or it could prompt the human labeler that two "people" may be the "same" person and ask the human labeler to decide whether they are.

Methodology 500 moves to block 504 and preprocesses the people list by going thru the "people list" provided by the human labeler to determine whether any of those persons listed was a previously-known person by the system. The goal of this operation is to take the "people list" provided by the human labeler and end with a system-determined "people list," where the system has already made some intelligent decisions about whether existing "person" models will be updated or new "person" representations will be created for each "person" on the "person list" provided by the human. In one or more embodiments, this could be determined by checking for a unique person-identifier accompanying each provided person in the human list, which would indicate that the human labeler took an auto-complete "similar face", or other known-person recommendation suggested by the system. In one or more embodiments, this could be done by looking for similar/matching names, etcetera in order to automatically judge that an existing person model should be updated, rather than creating a new person representation. In any event, the people list after this operation would include either a unique person-identifier if the system/human suggested matching to an existing person model or no unique person-identifier if the system/human suggested a new person object should be created.

Methodology 500 moves to block 506 and retrieves existing-person modules and creates new person representations for each person on a person list. This operation involves using the "people list" resulting from block 504 to retrieve the person models associated with each previously-seen person on the person list (as determined by whether a unique person-identifier is associated with an entry on the list, as described herein). For each entry on the list that does not have a unique person-identifier, a new person representation should be created for it. This new person model can include any information provided by the human about this entry, such as name, affiliation, the time the photo was taken, the location the photo was taken (if known), etcetera.

Methodology 500 moves to block 508 and reasons about the image and the people list. This operation involves generating additional "trusted" evidence about the image and using that together with the current "non-trusted" people list to try to determine a unique association of "person" representations to face objects within an image. The system can first run a face detection component on the image to generate a set of potential face sub-images. In one or more embodiments, a greedy face detector component is used to generate this set in order to generate the largest possible set of potential face sub-images. The system then determines whether the number of potential face sub-images agrees with the number of person representations retrieved/created during block 506.

In the simplest case, the number of potential faces extracted by the system and the number of person representations are in agreement and they both equal one (1). In one or more embodiments, when both agree and the number is one (1), the system can then associate that single face sub-image with that person representation. In one or more embodiments, when both agree and the number is one (1), the system can additionally determine whether this was a previously-seen person and compare the existing face sub-image to previously associated face sub-images for this person to determine a likelihood that this particular face is a true match. This would allow the system to be more robust to "dishonest" human labelers providing misinformation and labeling the wrong person in a given photo.

In a more complex case, the number of person representations is equal to one (1), but the face detector component used does not extract exactly one (1) face sub-image. In one or more embodiments, where a greedy face detector was first used to generate the set of face sub-images, it is possible that it extracted false-positives (i.e. non-face objects in addition to or instead of the actual face present). In such a scenario, it would be possible to then run the conservative face detector on the image to extract a set of face sub-images. In that case, if the number of extracted face sub-images is now equal to one (1) (and the number of person representations), this case could be reduced to that of the simplest case as described above. If the set of face sub-images extracted by the face detector component (whether greedy or conservative) is greater than one (1) and the single person representation listed had been previously-seen, the face recognition component could be run on each of the extracted face sub-images. If the face recognition component independently predicts this person representation (i.e., its unique person label) for one and only one of the face sub-images, this could be considered corroborating evidence and the face sub-image could now be uniquely associated with this single person representation. The additional face sub-images could optionally be stored and marked as potential false positives that could be used as training images in embodiments that perform learning and try to improve the face detection models (as described herein below). If the size of the set of face sub-images extracted by the face detector component (whether greedy or conservative) is zero (0), the image could be marked as potentially incongruous and optionally could be later be used in embodiments that perform learning and try to improve the face detection models (as described herein below). The system can still decide to update the model of this person representation as having been seen in this particular image, though it could not be corroborated by "trusted" evidence, and this information could be marked as being potentially untrue.

In another case, the number of listed people representations for this image is equal to zero (0). If the number of extracted face sub-images (by either face detection component) is also equal to zero (0), no further reasoning is necessary. If the number of extracted face sub-images is not equal to zero (0), the system may continue reasoning to determine whether the people representation information is potentially "dishonest", i.e., there are potentially persons present in the photo, though they were unlabeled by the human. In one or more embodiments, if the system first ran the greedy face detection component which indicated more than zero (0) potential face sub-images, the system can then run the conservative face detection component. If the conservative face detection component then finds zero (0) face sub-images, it is more likely that the "non-trusted" information (the empty set of person representations) is honest. Another embodiment could run face recognition on each extracted face sub-image in combination with a "threshold" on the face recognition confidence to determine whether the extracted face sub-image is also very likely to be a previously-seen person representation that was not listed by the human labeler in order to decide the "non-trusted" information (empty set of person representations) is very likely dishonest. In such cases, the image can be marked as potentially incongruous, and each extracted potential face sub-image can be stored. These can then later optionally be used as training images in embodiments that perform learning and try to improve the face detection models (as described herein below).

In still another case, the number of person representation may be greater than one (1). If the number of potential face sub-images from the face detection component agrees with the number of person representation, work can then begin around disambiguating and uniquely associating each face sub-image with each person representation. If the numbers do not agree, work could optionally be done to try to first further corroborate the current "non-trusted" information (the set of person representations). For example, in an embodiment where the greedy detector component was used to determine the potential face sub-images whose size disagrees with the number of person representations, the conservative detector component could then be run. If the number of potential face sub-images from the conservative detector component now matches the number of person representations, this set of potential face sub-images could be used instead. Regardless of whether the number of extracted face sub-images was less than or greater than the number of people representation, if there is a mismatch between the sizes, the image could optionally be marked as incongruous and later be examined and used in embodiments that perform learning and try to improve the face detection models (as described herein below).

For each potential face sub-image, the face recognition component could be run against each to determine the closest known-person match. If it is determined that the face recognition component independently verified a match with a person representation from the set in block 506 (i.e., there is a single face sub-image among this set which the face recognition component predicts to be this person representation), the face sub-image and the person representation can be considered matched. In one or more embodiments, the face recognition component could also be run in combination with a threshold on the recognition confidence in order to reduce the set of potential matching persons and potentially increase the number of verified matches. Once all "verified" matches are completed, the remaining set of potential face sub-images should be stored, along with the set of unique person representation identifiers for each person representation in the set from block 506 (minus any verified person representation matches carried out above). These face sub-images cannot currently be further disambiguated. However, storing these with the list of potentially matching person representations allows for potential further disambiguation at a later date and time when further images and labels are provided by humans to the system.

Methodology 500 moves to block 510 and updates face recognition components with matches from block 506. For any matches created during block 508, the face recognition component should now be updated/trained on this new face sub-image, which should be associated with the unique person identifier (label) associated with the person representation to which the face sub-image was matched.

Methodology 500 moves to block 512 and optionally performs constraint propagation for any matches made in block 506 back to previously uploaded ambiguous images. As described in block 508, it is possible that a given face sub-image is left with multiple potential matching person representations and unable to be further disambiguated at that point in time. For each match created during block 508, there is the potential that enough new information has now be amassed in order to go back and further disambiguate face sub-images from previously uploaded images. To try to disambiguate, the system should search for any "ambiguous" face sub-images which included the unique person identifier of the match in block 508. For each of the found ambiguous face sub-images, the system should also retrieve all other "ambiguous" face sub-images for that particular image, if any. It can now run a variation of block 508 on the face sub-images again, wherein it only searches for a single verified match between a face sub-image and person representation from the set of potential person representations stored with them, using the corroboration with the face recognition component as described above (rather than completing the full process described above, such as extracting face sub-images steps, etcetera). This may lead to a new unique match, as the face recognition component has been updated with a new face sub-image for this person in block 510.

As matches are made, the matching old face sub-images are no longer marked as "ambiguous" and are given a unique matching person representation. The matched person can also be removed from the list of potential matching person representations from the set of other ambiguous face sub-images associated with this image. As this happens, it is possible a face sub-image may be left with zero (0) potential person representations from the original set of possible person representations. Such a face sub-image can now be treated similarly to the "zero-person representation" case as described above in block 508. The face sub-image can be being optionally marked as such and optionally used as a training image in embodiments that perform learning and try to improve the face detection models (as described herein below). Still other face sub-images may be left with a single potential person representation from the original set of possible person representations. These face sub-images could now be treated similarly to the "one-person representation" case as described above in block 508 by being matched with that person representation. If additional matches between face sub-images and person representations are created during this operation, it can be recursively applied.

Methodology 500 moves to block 514 and optionally performs a merging of person representations. Optionally, after the person representation models are updated as much as they can be with the information obtained and computed for the current image, an additional step could take place where, based on the current model for each person currently in the system, the system may try to automatically "merge" people that it deems may be the "same" using any means (for example, by comparing face image similarity across people, name similarity, etcetera) or it could prompt the human labeler that two "people" may be the "same" person and ask the human labeler to decide whether they are the same.

As described herein above, a system that employs methodology 500 as described above can optionally include mechanisms for improving the face detection components it uses. In one or more embodiments, if such improvements take place, a predetermined, known test dataset could be used for testing face detection components as described herein below and for determining when new face detection components are better than the current ones and could be used instead. The precision/recall values for the face detection components (both greedy and conservative) could be computed against this given test dataset before any human input is done. In such a scenario, periodically a new face detection component could be "trained" using the positive and negative face sub-images the system generates as described in methodology 500 above. For example, a face sub-image that had zero (0) potential person representation matches would be a "negative example", and a face sub-image with a verified match with exactly one (1) person representation would be a "positive example.". The newly trained component's precision/recall could then be computed against that same test dataset. If the precision/recall for this new detector is determined to be better than the existing components it could then replace them. More specifically the newly train component would replace either the greedy or conservative component depending on whether it is a precision or recall improvement.

In another embodiment, the system could test both the existing and newly-trained face detection components against the data (positive and negative face sub-images) the system generates as described in methodology 500 above. For example, a face sub-image that had zero (0) potential person representation matches would be a "negative example," and a face sub-image with a verified match with exactly one (1) person representation would be a "positive example." This allows precision/recall values to be determined for the current face detection components and could be computed periodically without the use of a pre-labeled "test dataset." This could optionally take place after the system has been in use for some time or some number of images have been uploaded/labeled. New face detection components could be "trained" using a subset of the positive and negative face sub-images determined through methodology 500 described above. For example, a face sub-image that had zero (0) potential person representation matches would be a "negative example," and a face sub-image with a verified match with exactly one (1) person representation would be a "positive example" and "tested" against another subset of that data. If the precision/recall for the newly trained detector is determined to be better than the existing components, it could then replace them. More specifically, the newly trained detector would replace either the greedy or conservative component depending on whether it is a precision or recall improvement.

In a system that implements methodology 500 as described above, there could be an optional "recognition acknowledgement" provided back to the human after methodology 500 is completed. For example, this could be as simple as displaying the information provided by the human labeler next to the image uploaded. The acknowledgement could be varied based on a number of factors, such as the number of people listed by the human labeler, the number of people predicted to be in the image by the face detector(s), whether this is a "previously-seen" or new person, etcetera. In the case of a "previously-seen" person, this acknowledgement could include the last time the person was seen, last location the person was seen in, the location in which this is happening, what has been previously done in that location prior to now, and the "typical" location/time/people with the person. This is done to keep the human engaged in providing future images and more accurate "person lists" for each image, resulting in more interactions with the system, thus helping the system learn based on additional data. Similarly, in the case there is a disagreement between the human-provided information from and the generated "trusted" information from methodology 500 (such as the number of face sub-images detected by the face detector component(s)), this could also be surfaced in such an acknowledgement. For example, if the human provides no persons in the "person list" for the image, yet the face detection component believes there may be faces present (or especially when it believes there may be a large number of faces present), the system can surface this to the human in the acknowledgement, which may motivate the human to provide a more accurate "people list" during the next interaction with the system.

Thus, it can be seen from the foregoing description and illustration that one or more embodiments of the present disclosure provide technical features and benefits. The disclosed system does not require that users provide location information for persons depicted in an image. Specifically, only names, rather than names and location, are provided for persons within a given image. The present disclosure employs UI/UX elements that make it easy for image labeler(s) to choose/indicate persons who have previously been entered into the system. The present disclosure reduces mislabeling by "honest" labelers, it is robust to "dishonest" information provided by users as well as imperfect photos (varying lighting, objects in background, image size, etcetera, which are typically very hard for conventional face detection and recognition algorithms to cope with). The present disclosure further includes mechanisms for learning and improving over time, and implements a very flexible model of identity and recognition. This results in a powerful yet simple system for performing identity representation and recognition in the real-world.

Figure 6:
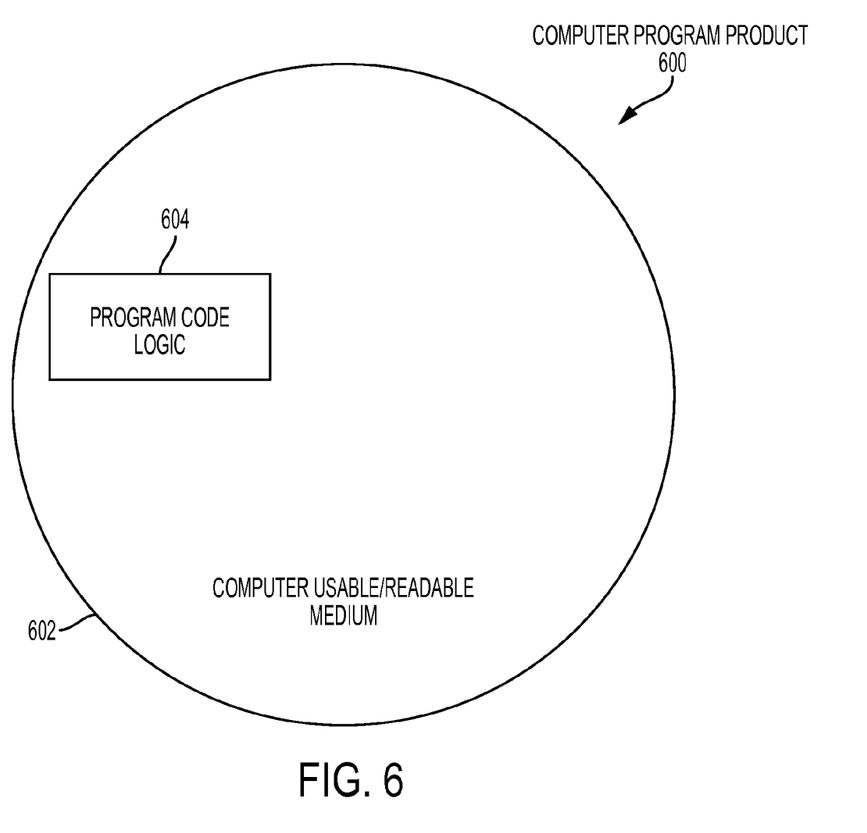
FIG. 6 depicts a computer program product in accordance with one or more embodiments.

Referring now to FIG. 6, a computer program product 600 in accordance with an embodiment that includes a computer readable storage medium 602 and program instructions 604 is generally shown.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

It will be understood that those skilled in the art, both now and in the future, may make various improvements and enhancements which fall within the scope of the claims which follow.

What is claimed is:

1. An image processing station for associating a non-trusted data set with a trusted data set, the station comprising;
    a user interface configured to receive the non-trusted data set from a user;
    the user interface comprising a trusted data source configured to capture the trusted data set;
    wherein the non-trusted data set received at the user interface from the user has not been associated with the trusted data set;
    wherein the trusted data set captured at the trusted data source of the user interface does not include the non-trusted data set;
    a memory; and
    a processor system communicatively coupled to the memory and the user interface;
    the processor system configured to perform processor operations configured to determine that the trusted data set is associated with the non-trusted data set, the processor operations comprising:
    receiving the trusted data set and the non-trusted data set;
    analyzing the trusted data set and the non-trusted data set to determine one or more relationships between the trusted data set and the non-trusted data set;
    generate, based at least in part on an output from analyzing the trusted data set and the non-trusted data set, a confidence value that represents a probability that at least a portion of the non-trusted data set identifies at least a portion of the trusted data set; and
    making a determination that the trusted data set is associated with the non-trusted data set based at least in part on the confidence value;
    wherein the processor operations assume that the non-trusted data set is not associated with the trusted data set until the processor operations make the determination that the trusted data set is associated with the non-trusted data set.

2. The station of claim 1, wherein:
    the processor operations further comprise, based at least in part on an assessment of the confidence value, storing in a first portion of the memory identified trusted data sets; and
    the identified trusted data sets comprise trusted data that has been determined to be identified by non-trusted data.

3. The station of claim 2, wherein the processor operations further comprise generating the confidence value based at least in part on at least one identified data set that was previously generated by the image processing station.

4. The station of claim 3, wherein the processor operations further comprise generating the confidence value based at least in part on at least one identified trusted data set generated by a separate image processing station communicatively coupled to the image processing station through a network.

5. The station of claim 1, wherein:
    the processor operations further comprise, based at least in part on the confidence value not exceeding a threshold, storing in a second portion of the memory partially identified trusted data sets; and
    the partially identified trusted data sets comprise trusted data that has not been determined to be identified by non-trusted data.

6. The station of claim 5, wherein the processor operations further comprise generating the confidence value based at least in part on at least one partially identified trusted data set that was previously generated by the image processing station.

7. The station of claim 6, wherein the processor operations further comprise generating the confidence value based at least in part on at least one partially identified trusted data set generated by a separate image processing station communicatively coupled to the image processing station through a network.

8. The station of claim 1, wherein the processor system comprises multiple processor circuits.

9. The station of claim 1, wherein:
    the portion of the non-trusted data set comprises a name; and
    the portion of the trusted data set comprises a face image.

10. The station of claim 1, wherein the processor system comprises:
    a comparison and reasoning circuit;
    a face recognition circuit; and
    a face detection circuit.

11. The station of claim 10, wherein the face detection circuit comprises:
    a greedy face detector; and
    a conservative face detector.

12. The station of claim 1, wherein the user interface comprises a camera.

13. The station of claim 1, wherein analyzing comprises applying data comparison operations and rule-based reasoning operations to the trusted data set and the non-associated non-trusted data.

14. A computer program product for associating a non-trusted data set with a trusted data set, the computer program product comprising:
    a computer readable storage medium having program instructions embodied therewith, wherein the computer readable storage medium is not a transitory signal per se, the program instructions readable by at least one processor circuit of an image processing station to cause the at least one processor circuit to perform a method configured to determine that the trusted data set is associated with the trusted data, the method comprising:
    receiving, at a user interface of the image processing station, the non-trusted data set from a user;
    capturing, at a trusted data source of the user interface, the trusted data set;
    wherein the non-trusted data set received from the user comprises non-associated non-trusted data that has not been associated with the trusted data set;
    wherein the trusted data set captured at the trusted data source does not include the non-trusted data set;

receiving the trusted data set and the non-trusted data set;

analyzing, using the at least one processor system of the image processing station communicatively coupled to a memory and the user interface, the trusted data set and the non-trusted data set to determine one or more relationships between the trusted data set and the non-trusted data set; and generating, using the at least one processor circuit communicatively coupled to the memory and the user interface, based at least in part on an output from analyzing the trusted data set and the non-trusted data set to determine one or more relationships between the trusted data set and the non-trusted data set, a confidence value that represents a probability that at least a portion of the non-trusted data set identifies at least a portion of the trusted data set; and making a determination that the trusted data set is associated with the non-trusted data set based at least in part on the confidence value;

wherein the method assumes that the non-trusted data set is not associated with the trusted data set until the method makes the determination that the trusted data set is associated with the non-trusted data set.

15. The computer program product of claim 14, wherein the method performed by the at least one processor circuit further comprises:

storing in a first portion of the memory, based at least in part on an assessment of the confidence value, identified trusted data sets; and storing in a second portion of the memory, based at least in part on the confidence value not exceeding a threshold, partially identified trusted data sets;

wherein, the identified trusted data sets comprise trusted data that has been determined to be identified by non-trusted data; and wherein, the partially identified trusted data sets comprise trusted data that has not been determined to be identified by non-trusted data.

16. The computer program product of claim 15, wherein generating further comprises generating the confidence value based at least in part on:

at least one identified trusted data set previously generated by the at least one processor circuit; and at least one identified trusted data set generated by a first separate image processing station communicatively coupled to the image processing station through a network.

17. The computer program product of claim 16, wherein the generating further comprises generating the confidence value based at least in part on:

at least partially identified trusted data set previously generated by the at least one processor circuit; and at least one partially identified trusted data set generated by a second separate image processing station communicatively coupled to the image processing station through a network.

18. The computer program product of claim 14, wherein analyzing comprises applying data comparison operations and rule-based reasoning operations to the trusted data set and the non-associated non-trusted data.

* * * * *